US012244030B2

(12) United States Patent
Painter et al.

(10) Patent No.: US 12,244,030 B2
(45) Date of Patent: Mar. 4, 2025

(54) SWAPPABLE DRIVE TRAIN ASSEMBLY

(71) Applicant: LAND ENERGY, INC, Cleveland, OH (US)

(72) Inventors: Evan Painter, Cleveland, OH (US); George Henry Remington, Bay Village, OH (US); Zack Simmering, Mansfield, OH (US); Scott Colosimo, Cleveland, OH (US)

(73) Assignee: LAND ENERGY, INC, Cleveland, OH (US)

( * ) Notice: Subject to any disclaimer, the term of this patent is extended or adjusted under 35 U.S.C. 154(b) by 145 days.

(21) Appl. No.: 17/931,317

(22) Filed: Sep. 12, 2022

(65) Prior Publication Data

US 2023/0079089 A1    Mar. 16, 2023

Related U.S. Application Data

(60) Provisional application No. 63/242,819, filed on Sep. 10, 2021.

(51) Int. Cl.
  *B62M 11/02*      (2006.01)
  *B60L 50/64*      (2019.01)
  (Continued)

(52) U.S. Cl.
  CPC .......... *H01M 50/258* (2021.01); *B60L 50/64* (2019.02); *B60L 53/80* (2019.02); *B62J 43/30* (2020.02);
  (Continued)

(58) Field of Classification Search
  CPC ............ F16H 1/00; F16H 7/02; F16H 37/027; B62M 11/00
  (Continued)

(56) References Cited

U.S. PATENT DOCUMENTS 3,512,599 A * 5/1970 Haddix .................. B62D 61/08
                                                    180/370
4,541,501 A * 9/1985 Kawasaki .............. B62K 5/027
                                                    280/282

(Continued)

OTHER PUBLICATIONS

International Search Report and Written Opinion for corresponding PCT International Application No. PCT/US2022/076253 mailed Jan. 2, 2023.

(Continued)

*Primary Examiner* — Ha Dinh Ho
(74) *Attorney, Agent, or Firm* — Renner, Otto, Boisselle & Sklar, LLP

(57) ABSTRACT

A swappable drive train assembly for a vehicle includes a rod removably attachable to a coupling arrangement of the vehicle that defines a first aperture and connects a first vehicle frame component and a second vehicle frame component. The swappable drive train assembly further includes an assembled gear cartridge attachable to the vehicle by the rod. The assembled gear cartridge is configured to rotate about the rod with respect to the coupling arrangement. The assembled gear cartridge is attachable to the vehicle by extending the rod through the first aperture and a second aperture of the assembled gear cartridge which maintains the connection between the first vehicle frame component and the second vehicle frame component while attaching and detaching the assembled gear cartridge.

18 Claims, 8 Drawing Sheets

(51) Int. Cl.
- *B60L 53/80* (2019.01)
- *B62J 43/30* (2020.01)
- *B62J 45/20* (2020.01)
- *B62J 50/22* (2020.01)
- *F16H 1/00* (2006.01)
- *F16H 7/02* (2006.01)
- *F16H 37/02* (2006.01)
- *G01R 31/36* (2020.01)
- *G01R 31/367* (2019.01)
- *G01R 31/396* (2019.01)
- *G01S 19/42* (2010.01)
- *H01M 10/42* (2006.01)
- *H01M 50/204* (2021.01)
- *H01M 50/209* (2021.01)
- *H01M 50/242* (2021.01)
- *H01M 50/249* (2021.01)
- *H01M 50/251* (2021.01)
- *H01M 50/256* (2021.01)
- *H01M 50/258* (2021.01)
- *H02J 9/06* (2006.01)
- *H02J 13/00* (2006.01)

(52) U.S. Cl.
CPC .............. *B62J 45/20* (2020.02); *B62J 50/22* (2020.02); *B62M 11/02* (2013.01); *G01R 31/3646* (2019.01); *G01R 31/367* (2019.01); *G01R 31/396* (2019.01); *G01S 19/42* (2013.01); *H01M 10/425* (2013.01); *H01M 50/204* (2021.01); *H01M 50/209* (2021.01); *H01M 50/242* (2021.01); *H01M 50/249* (2021.01); *H01M 50/251* (2021.01); *H01M 50/256* (2021.01); *H02J 9/06* (2013.01); *H02J 13/00022* (2020.01); *H01M 2010/4271* (2013.01); *H01M 2010/4278* (2013.01); *H01M 2220/10* (2013.01); *H01M 2220/20* (2013.01)

(58) Field of Classification Search
USPC ....................................................... 74/665 GE
See application file for complete search history.

(56) References Cited

U.S. PATENT DOCUMENTS

| | | | |
|---|---|---|---|
| 5,960,901 A * | 10/1999 | Hanagan | B60L 3/0046 296/187.02 |
| 8,397,854 B1 | 3/2013 | Nam et al. | |
| D701,796 S * | 4/2014 | Cao | D12/159 |
| 8,783,394 B1 * | 7/2014 | Nam | B60K 17/30 180/61 |

OTHER PUBLICATIONS

International Preliminary Report on Patentability for corresponding Application No. PCT/US2022/076253, issued Mar. 5, 2024.

* cited by examiner

SWAPPABLE DRIVE TRAIN ASSEMBLY

RELATED APPLICATION

This application claims priority to U.S. Provisional Patent Application No. 63/242,819, filed on Sep. 10, 2021, and titled "BATTERY SYSTEM AND BATTERY POWERED VEHICLE," the entirety of which is incorporated herein by reference.

FIELD

The disclosure relates to swappable drive train assembly of a vehicle.

BACKGROUND

Vehicles such as bicycles, electric bicycles, and motorcycles rely on a drive train assembly to cause motion in one part of the vehicle based on motion in another part of the vehicle. For instance, the drive train assembly can cause rotation of a rear wheel based on motor movement. The vehicle can be geared differently in the drive train assembly based on performance needs of the vehicle. Conventionally, the vehicle comes with a set drive train assembly selected in order to reach certain miles per gallon metrics or Environmental Protection Agency requirements.

SUMMARY

Conventionally, the process of changing a component of the drive train assembly, such as gearing up and/or gearing down, is a time intensive and complicated endeavor. The user has to disassemble the frame of the vehicle to access the drive train assembly, detach a selected sprocket from the vehicle, reattach the new sprocket, and then reassemble the frame around the new sprocket. The present application provides a swappable drive train assembly that can be swapped in and out to gear up and/or gear down without having to disassemble the vehicle frame. The swappable drive train assembly described herein includes a rod removably attachable to a coupling arrangement of the vehicle that connects a first vehicle frame component and a second vehicle component and an assembled gear cartridge attachable to vehicle by the rod. The assembled gear cartridge can be swapped for another assembled gear cartridge by pulling the rod through the coupling arrangement which disconnects the assembled gear cartridge, removing the disconnected assembled gear cartridge, inserting a new assembled gear cartridge, and inserting the rod through the coupling arrangement and into the new assembled gear cartridge to attach the new assembled gear cartridge to the vehicle frame.

According to an aspect of the disclosure, a swappable drive train assembly for a vehicle comprises a rod removably attachable to a coupling arrangement of the vehicle, wherein the rod is detached from the coupling arrangement by passing the rod through a first aperture formed by the coupling arrangement, wherein the coupling arrangement connects a first vehicle frame component and a second vehicle frame component; and an assembled gear cartridge attachable to the vehicle by the rod, wherein the rod extends through a second aperture defined by the assembled gear cartridge, wherein the assembled gear cartridge is configured to rotate about the rod with respect to the coupling arrangement, wherein the assembled gear cartridge is attachable to the vehicle by extending the rod through the first aperture and the second aperture which maintains the connection between the first vehicle frame component and the second vehicle frame component while attaching and detaching the assembled gear cartridge.

According to an embodiment of any paragraph(s) of this summary, the assembled gear cartridge includes a first rotation transmission structure at a first end, a second rotation transmission structure at a second end that is opposite the first end, and a jackshaft extending therebetween.

According to an embodiment of any paragraph(s) of this summary, the first rotation transmission structure comprises a pulley, wherein the second rotation transmission structure comprises a sprocket.

According to an embodiment of any paragraph(s) of this summary, further comprises a jackshaft spacer arranged on the rod between the assembled gear cartridge and the coupling arrangement when the assembled gear cartridge is attached to the vehicle, wherein the jackshaft spacer is shaped to space the assembled gear cartridge from the coupling arrangement.

According to an embodiment of any paragraph(s) of this summary, further comprises a swing arm attachment arranged on the rod between the assembled gear cartridge and the coupling arrangement when the assembled gear cartridge is attached to the vehicle, wherein the swing arm attachment is configured for attachment to a swing arm frame of the vehicle.

According to an embodiment of any paragraph(s) of this summary, further comprises a pivot sleeve arranged on the rod with a first portion that extends outside the coupling arrangement and a second portion that extends into the coupling arrangement between the rod and an interior of the coupling arrangement.

According to an embodiment of any paragraph(s) of this summary, the rod is further removably attachable to a second coupling arrangement of the vehicle, wherein second coupling arrangement additionally connects the first vehicle frame component and the second vehicle frame component, wherein the rod is configured to extend between the coupling arrangement and the second coupling arrangement.

According to an embodiment of any paragraph(s) of this summary, the assembled gear cartridge is shaped to extend along the rod between the first pivot clamp arrangement and the second pivot clamp arrangement.

According to an embodiment of any paragraph(s) of this summary, further comprises a trim ring arranged on a first side of the coupling arrangement, wherein the assembled gear arrangement is arranged on a second side of the coupling arrangement opposite the first side; and a connector configured to connect the trim ring and the rod to prevent lateral movement of the assembled gear arrangement relative to the coupling arrangement.

According to an embodiment of any paragraph(s) of this summary, further comprises a second assembled gear cartridge attachable to the vehicle by the rod, wherein the second assembled gear cartridge is configured to rotate about the rod with respect to the coupling arrangement, wherein the assembled gear cartridge includes a first sprocket, wherein the second gear cartridge includes a second sprocket that is different from the first sprocket.

According to another aspect of the disclosure, a vehicle comprises a first vehicle frame component; a second vehicle frame component; a coupling arrangement configured to couple the first vehicle frame component and the second vehicle frame component; a swappable drive train assembly removably attachable to the coupling arrangement, wherein the swappable drive train assembly is further configured for attachment to and detachment from the coupling arrangement without requiring disconnection of the first vehicle frame component and the second vehicle frame component, wherein the swappable drive train assembly includes: a rod removably attachable to the coupling arrangement; and an assembled gear cartridge rotatably attached to the rod, wherein the assembled gear cartridge is configured to rotate about the rod with respect to the coupling arrangement.

According to an embodiment of any paragraph(s) of this summary, the coupling arrangement includes: a first pivot clamp; a second pivot clamp; and a connector configured to connect the first pivot clamp and the second pivot clamp.

According to an embodiment of any paragraph(s) of this summary, an interior surface of the coupling arrangement is shaped to receive a pivot sleeve arranged between the rod and the interior surface of the coupling arrangement.

According to an embodiment of any paragraph(s) of this summary, further comprises a swing arm frame, wherein the swappable drive train assembly further includes a swing arm attachment arranged on the rod between the assembled gear cartridge and the coupling arrangement when the assembled gear cartridge is attached to the vehicle, wherein the swing arm attachment is configured for attachment to the swing arm frame.

According to an embodiment of any paragraph(s) of this summary, further comprises a peg assembly configured for attachment to the vehicle, wherein the coupling arrangement is shaped for attachment of the peg assembly on a first side of the coupling arrangement and extension of the rod from a second side of the coupling arrangement opposite the first side, wherein the peg assembly includes a protrusion for attaching a pedal to the peg assembly.

According to an embodiment of any paragraph(s) of this summary, the peg assembly includes a second protrusion for attaching a kickstand to the peg assembly.

According to an embodiment of any paragraph(s) of this summary, further comprises a second coupling arrangement configured to couple the first vehicle frame component and the second vehicle frame component, wherein the swappable drive train assembly is further removably attachable to the second coupling arrangement, wherein the rod extends between the coupling arrangement and the second coupling arrangement when the swappable drive train assembly is attached to the vehicle According to an embodiment of any paragraph(s) of this summary, the swappable drive train assembly further includes a second assembled gear cartridge attachable to the vehicle by the rod, wherein the second assembled gear cartridge is configured to rotate about the rod with respect to the coupling arrangement, wherein the assembled gear cartridge includes a first sprocket, wherein the second gear cartridge includes a second sprocket that is different from the first sprocket According to yet another aspect of the disclosure, a swappable drive train assembly for a vehicle comprising: a rod removably attachable to a coupling arrangement of the vehicle that connects a first vehicle frame component and a second vehicle frame component; a first assembled gear cartridge attachable to the vehicle by the rod, wherein the first assembled gear cartridge includes a first sprocket; and a second assembled gear cartridge attachable to the vehicle by the rod, wherein the second assembled gear cartridge includes a second sprocket, wherein the first sprocket and the second sprocket are different, wherein at least one of the first assembled gear cartridge or the second gear cartridge is attachable to the vehicle by extending the rod through an aperture defined by the coupling arrangement while maintaining the connection between the first vehicle frame component and the second vehicle frame component.

According to an embodiment of any paragraph(s) of this summary, the rod is further removably attachable to a second coupling arrangement of the vehicle that additionally connects the first vehicle frame component and the second vehicle frame component, wherein the rod is configured to extend between the coupling arrangement and the second coupling arrangement, wherein at least one of the first assembled gear cartridge or the second assembled gear cartridge is configured to extend along the rod between the coupling arrangement and the second coupling arrangement.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

Figure 1:
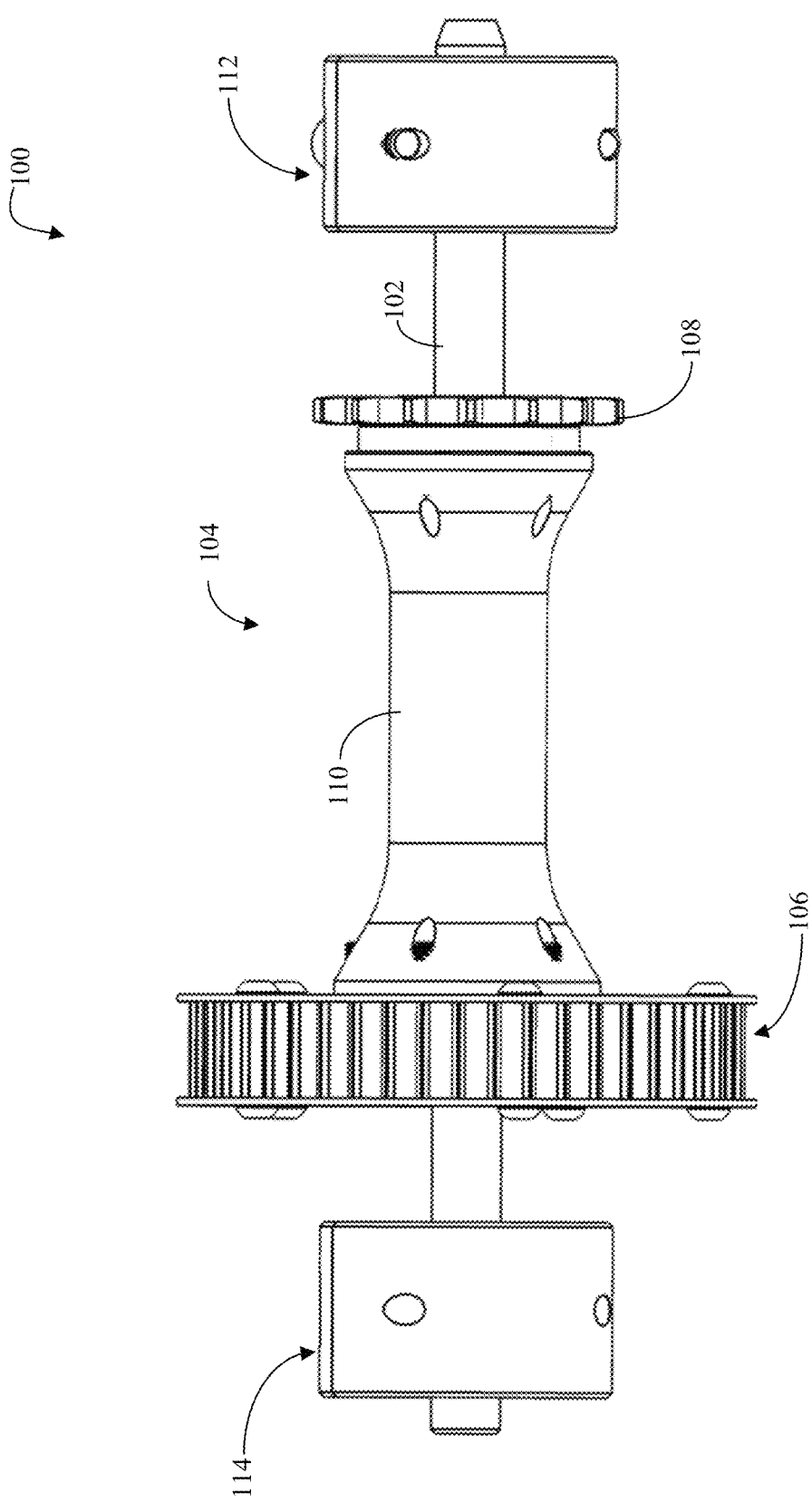
FIG. 1 is a view of a swappable drive train assembly including a rod and an assembled gear cartridge according to an embodiment of the disclosure.

Aspects of the present application pertain to a swappable drive train assembly are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Turning now to FIG. 1, a swappable drive train assembly 100 for a vehicle that allows a user to swap an assembled gear cartridge without having to disassemble a chassis of the vehicle. The swappable drive train assembly 100 can be designed or configured for any type of vehicle with different components added and/or removed as necessary. In the embodiments illustrated herein, the swappable drive train assembly 100 is configured for use with a two-wheel vehicle, such as bicycle, motorcycle, electric bicycle, and/or the like.

The illustrated swappable drive train assembly 100 includes a rod 102 that can be removably attached to a frame of the vehicle and an assembled gear cartridge 104 rotatably secured on the rod 102 and further configured to transmit rotation between one part of the vehicle and another part of the vehicle. The rod 102 can be fixedly attached to the frame of the vehicle such that the assembled gear cartridge 104 rotates with respect to the frame. The rod 102 extends through an aperture defined by the assembled gear cartridge 104 and the central longitudinal axis of the rod 102 defines a rotation axis of the assembled gear cartridge 104. The swappable drive train assembly 100 is configured such that a user can swap one assembled gear cartridge for another assembled gear cartridge without having to disassemble the vehicle chassis.

The assembled gear cartridge 104 includes a first rotation transmission structure for rotatably attaching to a first portion of the vehicle and a second rotation transmission structure for rotatably attaching to a second portion of the vehicle. In one embodiment, the assembled gear cartridge 104 can be configured such that rotation of the first portion drives rotation of the assembled gear cartridge 104 which in turn drives rotation of the second portion and/or vice-versa with the second portion driving rotation of the first portion. In another embodiment, the assembled gear cartridge 104 can be configured to rotate and the rotation of the assembled gear cartridge 104 causes a rotation of the first portion and the second portion, similar to pedaling a bicycle.

The assembled gear cartridge 104 can be further configured for a gear differential between the first portion and the second portion. For instance, the first rotation transmission structure can have a first diameter while the second rotation transmission structure can have a second diameter that is different from the first diameter to cause a first rotational speed of the first portion and a second rotational speed of the second portion. In an exemplary embodiment, the radius of the first rotation transmission structure is larger than the radius of the second rotation transmission, such that a rotational speed of the second portion is higher than the rotational speed of the first portion.

The first rotation transmission structure and the second rotation transmission structure can be similar type of structure and/or can vary. In the illustrated embodiments, the first rotation transmission structure and the second rotation transmission structure are different, namely one is a pulley 106 and the other is a sprocket 108. The pulley 106 can be configured for attachment to a timing belt (omitted for clarity) to rotatably connect the pulley 106 and the first portion of the vehicle. The sprocket 108 can be configured for attachment to a roller chain (omitted for clarity) to rotatably connect the sprocket 108 to the second portion of the vehicle. As can be seen in FIG. 1, the pulley 106 has a diameter that is larger than the diameter of the sprocket 108.

The pulley 106 and the sprocket 108 can be spaced from one another in the assembled gear cartridge 104 and in the illustrated embodiment, a jackshaft 110 extends between the pulley 106 and the sprocket 108. The jackshaft 110 can take any suitable shape, size, and/or configuration. In the illustrated embodiment, the jackshaft 110 has a variety of different thicknesses along a length of the jackshaft 110. The pulley 106 and the sprocket 108 can be fixedly attached to the jackshaft 110 such that rotation of the pulley 106 causes a corresponding rotation of the sprocket 108 and/or vice-versa.

As mentioned above, the rod 102 is removably attachable to the frame of the vehicle. For instance, the frame of the vehicle includes one or more coupling arrangements that couple different parts of the frame together and the rod 102 can be removably attached to any suitable number of the coupling arrangements in the frame. In FIG. 1, the vehicle chassis includes a first coupling arrangement 112 and a second coupling arrangement 114 (hereinafter, coupling arrangements 112 and 114) are illustrated, with the frame component(s) removed for clarity. The illustrated rod 102 is configured to extend between the first coupling arrangement 112 and the second coupling arrangement 114.

As will be explained in detail below with respect to FIGS. 6 and 7, a user can swap the assembled gear cartridge 104 for a new assembled gear cartridge by passing the rod 102 through the first coupling arrangement 112 and/or the second coupling arrangement 114. The user can then disconnect the assembled gear cartridge 104, insert the new assembled gear cartridge, and insert the rod 102 through the first coupling arrangement 112 into and through the aperture of the new assembled gear cartridge and into the second coupling arrangement 114. Thus, the user can quickly swap assembled gear cartridges without having to go through the time-intensive conventional process of disassembling the vehicle chassis.

The assembled gear cartridge 104 can be rotatably located on any suitable portion of the rod 102 to rotate with respect to the frame. In the illustrated embodiment, the assembled gear cartridge 104 is rotatably located on a portion of the rod 102 between the first coupling arrangement 112 and the second coupling arrangement 114. As can be seen in FIG. 1, the rod 102 and/or the assembled gear cartridge 104 can be shaped such that the assembled gear cartridge 104 is spaced from the first coupling arrangement 112 and/or the second coupling arrangement 114. In the illustrated embodiment, the assembled gear cartridge 104 is spaced from both the first coupling arrangement 112 and the second coupling arrangement 114.

Figure 2:
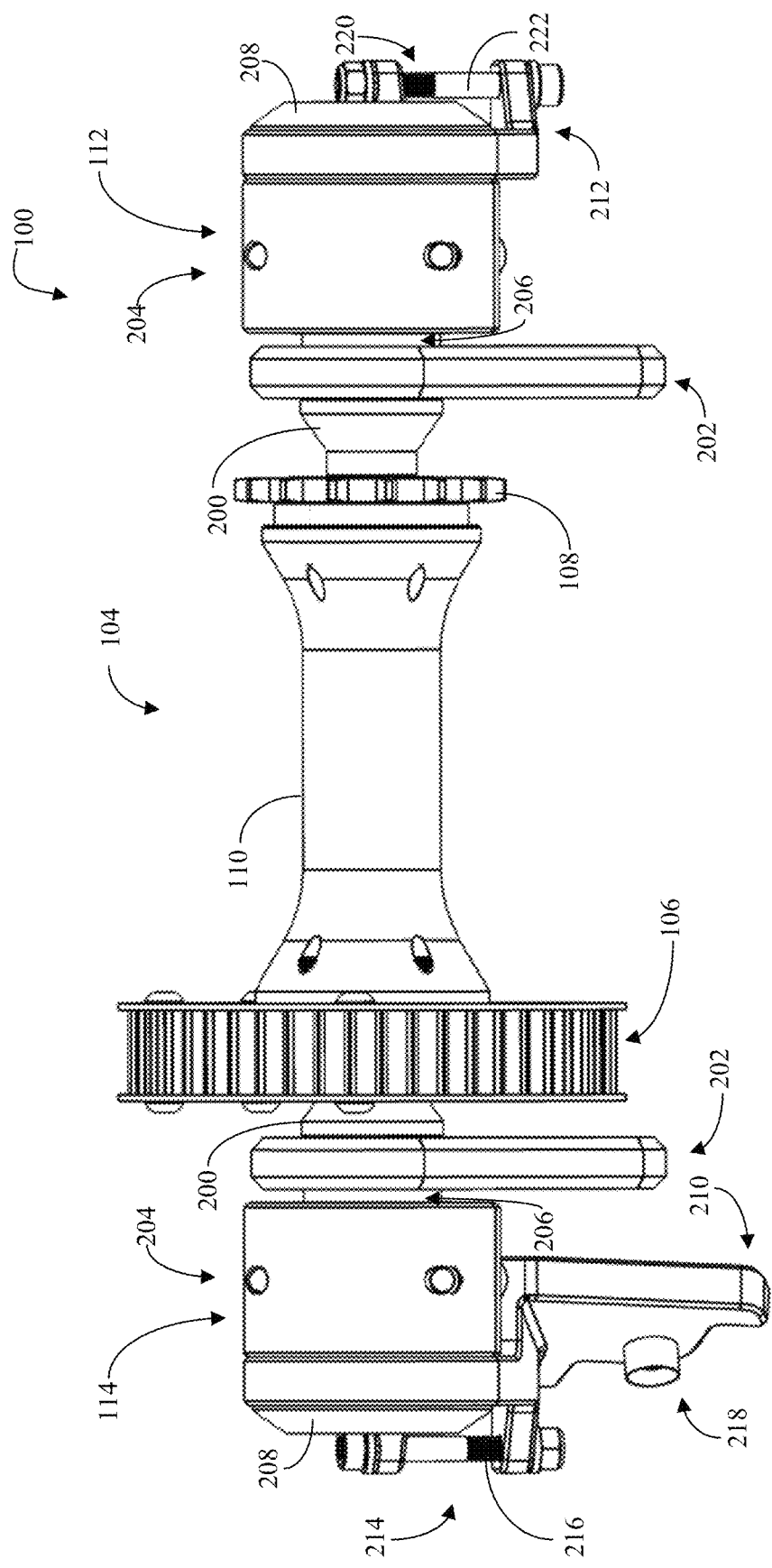
FIG. 2 is a view of the swappable drive train assembly of FIG. 1 with additional components.

The swappable drive train assembly 100 may further include one or more components arranged on the rod 102 in addition to the assembled gear cartridge 104, the first coupling arrangement 112, and the second coupling arrangement 114. Illustrated in FIG. 2 is an embodiment of the swappable drive train assembly 100 of FIG. 1 with additional components arranged on the rod 102. In the illustrated embodiment, a jackshaft spacer 200 is arranged on each side of the assembled gear cartridge 104 to space other components, such as the first coupling arrangements 112 and/or the second coupling arrangement 114, from the assembled gear cartridge 104. The other components can be spaced from the assembled gear cartridge 104 to limit and/or prevent impeding the rotation of the assembled gear cartridge 104.

Progressing outward along the rod 102, the vehicle may further include a swing arm attachment 202 adjacent each of the jackshaft spacers 200. The swing arm attachment 202 can be attached to a frame component of the vehicle, omitted for clarity. The swing arm attachment 202 may be configured to be pivotable about the rod 102 (similar to the assembled gear cartridge 104) and/or may be fixed with respect to the rod 102.

Progressing further outward along the rod 102, the vehicle may yet further include a pivot sleeve 204 adjacent the swing arm attachment 202. The pivot sleeve 204 may include a first portion 206 that extends along the rod 102 outside of the respective coupling arrangement and a second portion (not visible) that extends along the rod 102 within the respective coupling arrangement. As will be explained in detail below, the first portion 206 may be shaped to receive the swing arm attachment 202 such that a part of the first portion 206 is sandwiched between the swing arm attachment 202 and the rod 102.

The vehicle may further include a cap 208 attached to one or more ends of the rod 102 that extend outside the coupling arrangements 112 and 114 to limit or prevent lateral movement of the rod 102 with respect to the coupling arrangements 112 and 114. In the illustrated embodiment, each end of the rod 102 includes a respective cap 208 attached thereon.

As briefly discussed above, the illustrated vehicle is a two-wheeled vehicle, such as a motorcycle, and thus may include one or more pedals. The pedals may be fixedly attached to the frame of the vehicle and/or the pedals may be rotatably attached to the frame to permit a user to rotate the pedals, similar to a bicycle. In the embodiments illustrated herein, the pedals are fixedly attached to the vehicle. The vehicle may include one or more peg assemblies attached to the frame of the vehicle and may extend around the rod 102 that can then have a pedal attached thereto.

In the illustrated embodiment, the vehicle includes a first peg assembly 210 positioned between the cap 208 and the first coupling arrangement 112 and a second peg assembly 212 positioned between the cap 208 and the second coupling arrangement 114. The first peg assembly 210 and the second peg assembly 212 can be similar or can vary, as illustrated. In the illustrated embodiment, the first peg assembly 210 includes a first attachment structure 214 configured for attaching a pedal thereto. In the illustrated embodiment, the first attachment structure 214 comprises one or more protrusions and a bolt 216 extending through the protrusion(s) to attach the pedal thereto.

The first peg assembly 210 further includes a second attachment structure 218 for attaching a kickstand thereto. In the illustrated embodiment, the second attachment structure comprises a protrusion that pivotably receives the kickstand to permit rotation of the kickstand relative to the vehicle.

Similar to the first peg assembly 210, the second peg assembly 212 includes an attachment structure 220 for securing a pedal to the second peg assembly 212. The first attachment structure 214 of the first peg assembly 210 and the attachment structure 220 of the second peg assembly 212 may be similar and/or may vary. In the illustrated embodiment, the first attachment structure 214 and the attachment structure 220 are similar such that the attachment structure 220 comprises one or more protrusions and a bolt 222 extending through the protrusion(s) to attach the pedal thereto.

Figure 3:
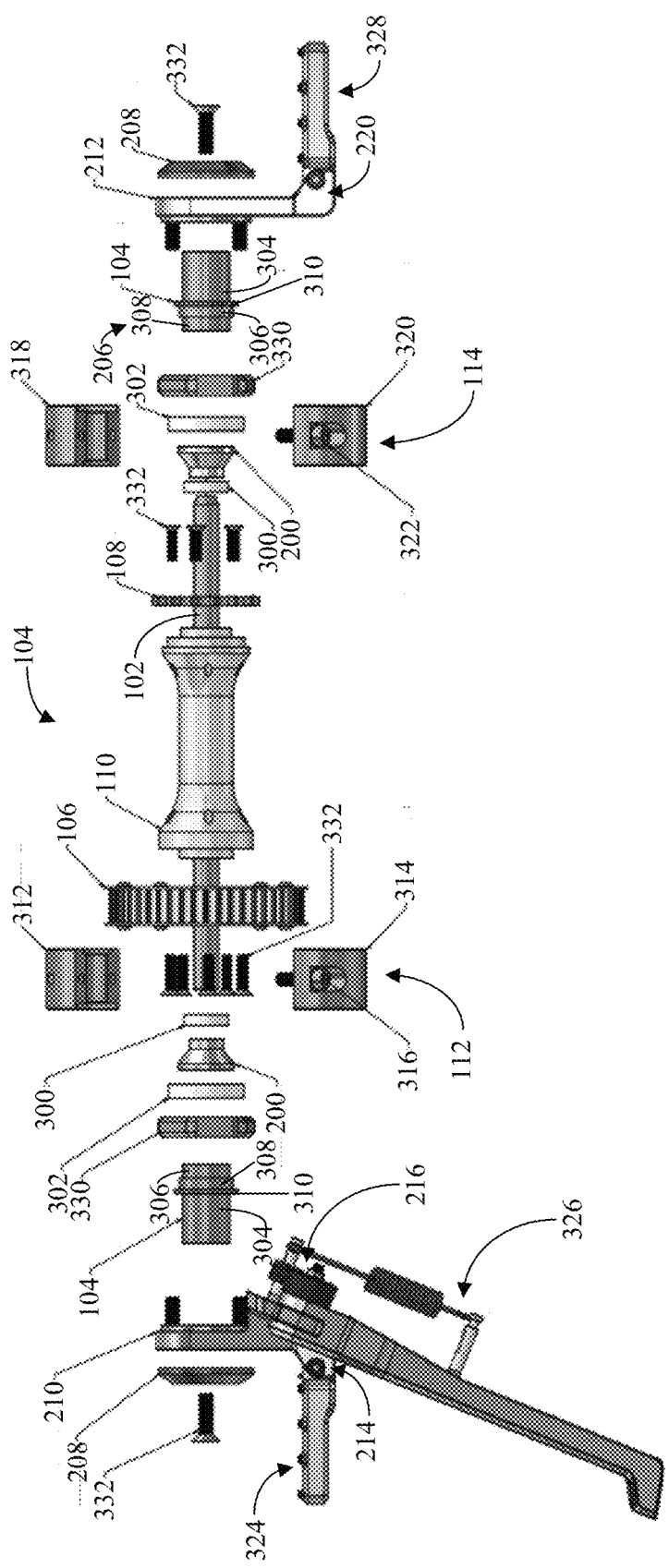
FIG. 3 is an exploded view of the swappable drive train assembly of FIG. 2.

Turning now to FIG. 3, illustrated is an exploded view of the arrangement of FIG. 2. To facilitate rotation of the assembled gear cartridge 104 about the rod 102, the assembled gear cartridge 104 can include one or more jackshaft bearings 300 arranged between the assembled gear cartridge 104. Similarly, to permit pivoting of the swing arm attachment 202, the vehicle can include a swing arm bearing 302 for each swing arm attachment 202 or only for the pivotable swing arm attachments 202. In the illustrated embodiment, the vehicle includes two swing arm bearings 302 that allow each swing arm attachment 202 (omitted for clarity) to pivot.

As briefly noted above, the pivot sleeve 204 includes a first portion 206 that extends outside the respective coupling arrangement and a second portion 304 that extends along the rod 102 within the coupling arrangement. The pivot sleeve 204 can have a uniform thickness along a length of the pivot sleeve 204 and/or can vary, as illustrated. In the illustrated embodiment, the first portion 206 is stepped with a first part 306 with a first thickness and a second part 308 with a second thickness that is smaller than the first thickness. As will be shown in detail below, the first portion 206 can be shaped such that the swing arm bearing 302 surrounds the second part 308 and abuts the first part 306.

The illustrated pivot sleeve 204 further includes a third portion 310 between the first portion 206 and the second portion 304 with a thickness larger than the first portion 206 and/or the second portion 304. The third portion 310 can be used to align the pivot sleeve 204 in their respective coupling arrangement.

The coupling arrangements 112 and 114 can take any suitable configuration for connecting different parts of the frame of the vehicle and maintaining the connection while permitting the swappable drive train assembly 100 to be attached and detached. In the embodiment illustrated in FIG. 3, each of the coupling arrangements 112 and 114 includes at least two pivot clamps that are then connected around the rod 102. More particularly, as illustrated, the first coupling arrangement 112 includes a first pivot clamp 312 and a second pivot clamp 314 that are coupled together via a fastener 316. Similarly, the second coupling arrangement 114 includes a first pivot clamp 318 and a second pivot clamp 320 that are coupled together via a fastener 322. As can be seen in FIG. 3, and will be explained in detail below, the interior of the coupling arrangements 112 and 114 can be shaped to align the different components described herein when assembling the vehicle.

In the view illustrated in FIG. 3, the first peg assembly 210 includes a pedal 324 attached to the first attachment structure 214 and a kickstand 326 attached to the second attachment structure 216. Similarly, the illustrated second peg assembly 212 includes a pedal 328 attached to the attachment structure 220. The vehicle may further include one or more pivot plates 330.

The arrangement may further include one or more fixings configured to connect different components. For instance, the illustrated arrangement includes a variety of different sized and shaped set screws 332 that can be used to connect the different components, such as the cap 208 to the rod 102, the pulley 106 to the jackshaft 110, and/or the like.

Figure 4:
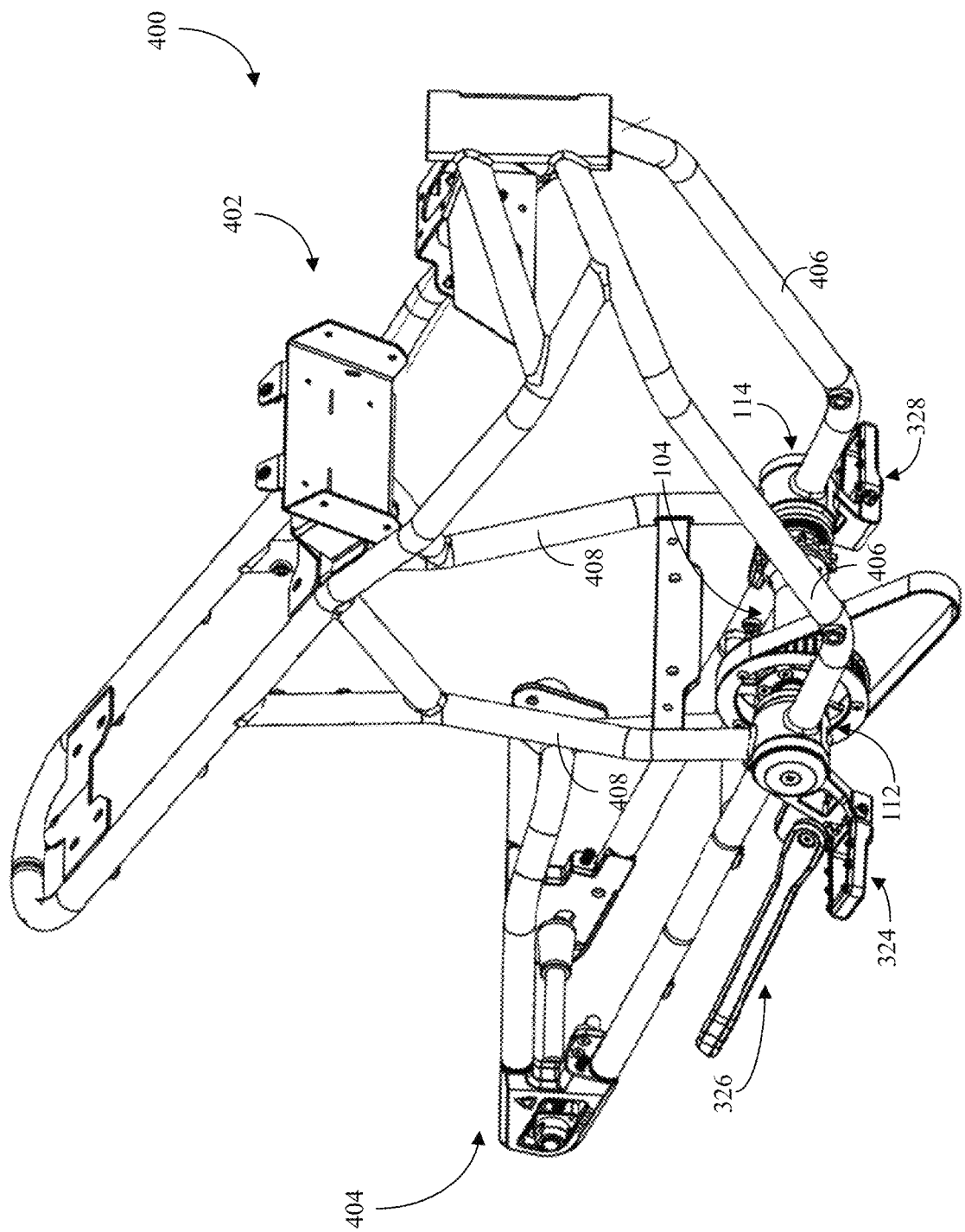
FIG. 4 is a view of a swappable drive train assembly attached to a vehicle frame according to another embodiment of the disclosure.

Turning now to FIG. 4, illustrated is a view of the assembly embodiment of FIG. 2 with portions of the chassis of the vehicle included to indicate a position of the swappable drive train assembly 100 within a vehicle chassis 400. The swappable drive train 100 can be placed at any suitable location within the chassis and may depend on the configuration of the vehicle and/or conventional location of the drive train. As can be seen in FIG. 4, the vehicle chassis 400 includes a body frame 402 and a swing arm frame 404 that is pivotable with respect to the body frame 402. The swappable drive train assembly 100 is attached to the body frame 402 and, additionally, acts as a pivot point for the swing arm frame 404.

More particularly, the coupling arrangements 112 and 114 are each arranged at an intersection of bottom rails 406 of the chassis 400 and center posts 408 of the body frame 402, such that the bottom rail 406 extends from a first part of a coupling arrangement and the center post 408 extends from a second part of the coupling arrangement. As described above, the assembly embodiment of FIG. 2 includes swing arm attachments 202 that are connected to corresponding arms of the swing arm frame 404 in the view illustrated in FIG. 4.

Figure 5:
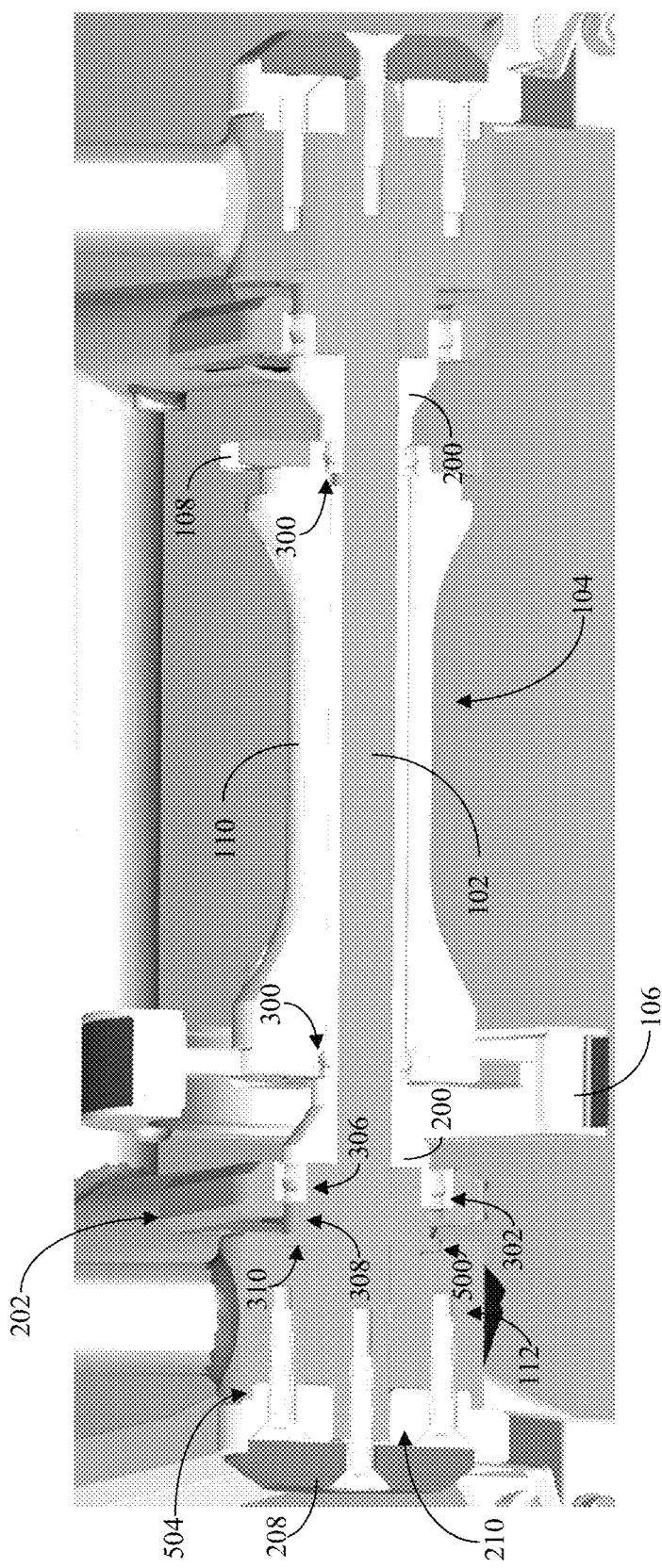
FIG. 5 is a cross-sectional view of the swappable drive train assembly of FIG. 4.

Turning now to FIG. 5, illustrated is a cross-sectional view of assembly in FIG. 4 along a central axis of the rod 102. As seen in FIG. 5, the rod 102 extends through a central axis of the assembled gear cartridge 104 and defines the rotational axis of the assembled gear cartridge 104. The assembled gear cartridge 104 rotates about the rod 102 by way of the jackshaft bearings 300 therebetween. Any suitable bearing type can be used, and in the illustrated embodiment, the jackshaft bearings 300 are roller bearings.

As can be seen more clearly in FIG. 5, the jackshaft spacer 200, the pivot sleeve 204, and the swing arm bearing 302 are configured such that the swing arm bearing 302 rests on the second part 308 of the pivot sleeve 204 and is sandwiched between the first part 306 of the pivot sleeve 204 and the jackshaft spacer 200. The sandwiching prevents lateral movement of the swing arm bearing 302, and by extension the swing arm attachment 202. Moreover, because the pivot sleeve 204 remains within the coupling arrangement regardless of the position of the rod 102, placing the swing arm bearing 302 on the pivot sleeve 204 causes the swing arm attachment 202 to remain connected to the coupling arrangement. Thus, the swing arm frame 404 remains connected to the body frame 402 via the connection of the swing arm attachment 202 and the coupling arrangement, regardless of the position of the rod 102. Similar to the jackshaft bearing, the swing arm bearing 302 can comprise any suitable bearing type, and in the illustrated embodiment, the swing arm bearing 302 is a roller bearing.

As briefly noted above, the interior of the coupling arrangements 112 and 114 can be shaped to align one or more components of the assembly of FIG. 3. Discussion is now made with respect to the first coupling arrangement 112 but can also be applied to the second coupling arrangement 114 as well. As can be seen in FIG. 5, the coupling arrangement 112 defines an aperture 500 shaped to receive the rod 102 and a portion of the pivot sleeve 204 surrounding the rod 102. The illustrated first coupling arrangement 112 further includes a first indent 502 formed on a first side of the first coupling arrangement 112 and a second indent 504 formed on a second opposite side of the first coupling arrangement 112. As noted above, the pivot sleeve 204 includes a thicker third portion 310 and first indent 502 can be shaped to engage the third portion 310 and limit lateral travel of the pivot sleeve 204 into the first coupling arrangement 112. By limiting lateral movement, the third portion 310 and the first indent 502 can keep the first portion 206 of the pivot sleeve 204 outside of the first coupling arrangement 112.

The second indent 504 can be shaped to align the peg assembly being attached to the first coupling arrangement 112. In the illustrated embodiment, the first peg assembly 210 is attached to the first coupling arrangement 112. The second indent 504 can both align attachment points of the first peg assembly 210 and the first coupling arrangement 112 such that fasteners can pass through the first peg assembly 210 to secure the first peg assembly and the first coupling arrangement 112 as well as define a distance the first peg assembly 210 can extend into the first coupling arrangement 112.

Figure 6:
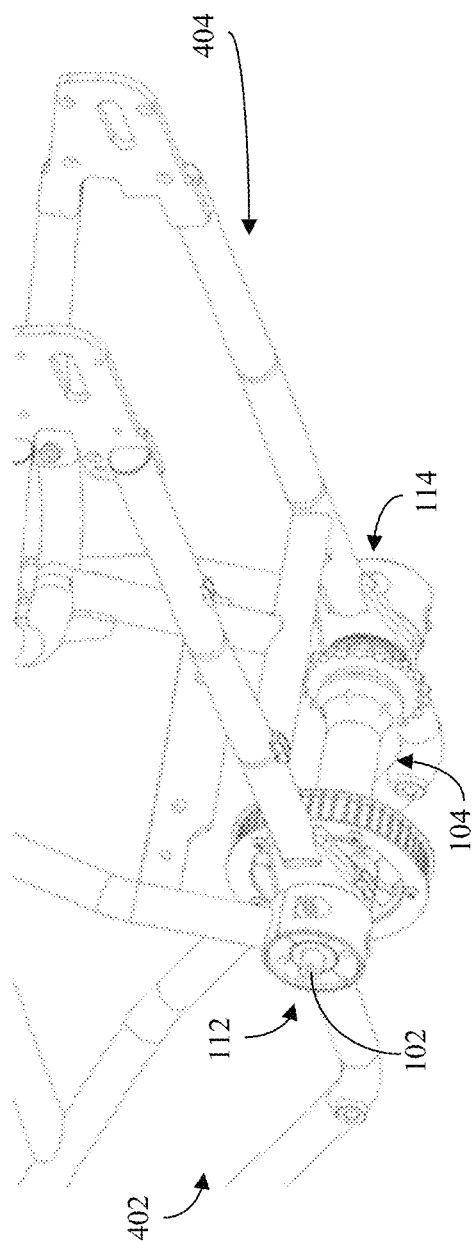
FIGS. 6 and 7 illustrate a process of disconnecting the swappable drive train assembly from a vehicle frame according to an embodiment of the disclosure.
Figure 7:
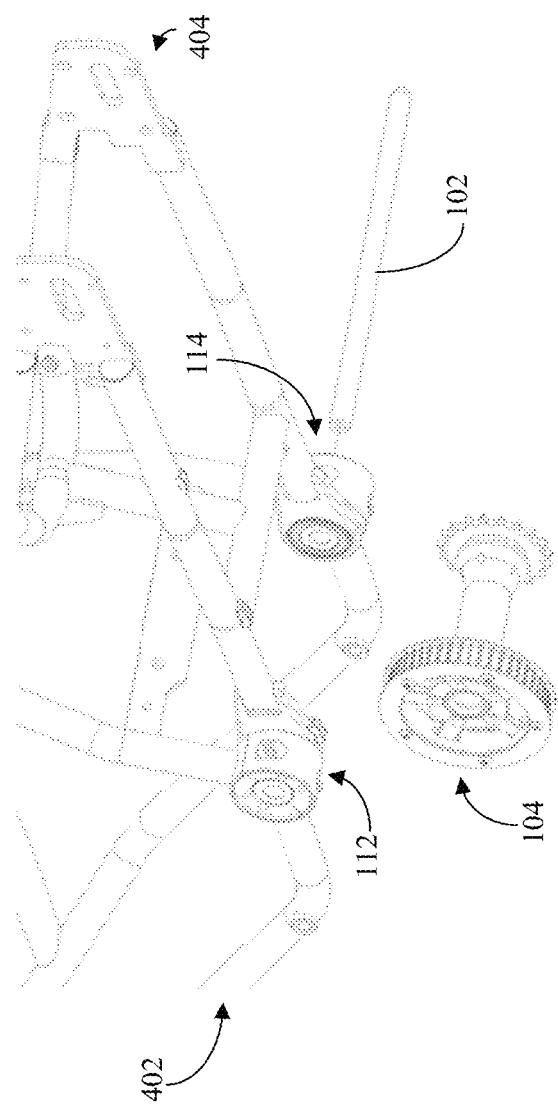

Turning now to FIGS. 6 and 7, illustrated is a process of swapping assembled gear cartridges. More particularly, the illustrated embodiment shows a process of detaching the swappable drive train assembly 100 illustrated in FIG. 4. In an initial step in FIG. 6, the caps 208 are disconnected from the ends of the rod 102 and the first peg assembly 210 and the second peg assembly 212 are disconnected from the first coupling arrangement 112 and the second coupling arrangement 114, respectively. By detaching the caps 208 and the peg assemblies 210 and 212, the ends of the rod 102 are exposed, as seen in FIG. 6. Additionally, the pulley 106 can be detached from the timing belt (omitted for clarity) and/or the sprocket 108 can be detached from the roller chain (omitted for clarity).

Exposing the ends of the rod 102 permits a user to pull the rod 102 through the first coupling arrangement 112 or the second coupling arrangement 114. In the position illustrated in FIG. 7, the rod 102 was pulled through the second coupling arrangement 114. The user can then remove the assembled gear cartridge 104 without having to disassemble the vehicle chassis 400. More particularly, the first coupling arrangement 112, the second coupling arrangement 114, the pivot sleeves 204, and the swing arm attachments 202 allow the body frame 402 and the swing arm frame 404 to maintain their connection and their assembled shapes illustrated in FIG. 4.

The user can then attach a new assembled gear cartridge by aligning the central aperture in the new assembled gear cartridge with the aperture 500 in the first coupling arrangement 112 and/or the aperture 500 in the second coupling arrangement 114 and inserting the rod 102 therethrough. Peg assemblies (e.g., the first peg assembly 210) and caps 208 can then be attached as desired. The jackshaft spacer 200 can be separately removed and added as needed based on the assembled gear cartridge in the swappable drive train assembly 100.

Figure 8:
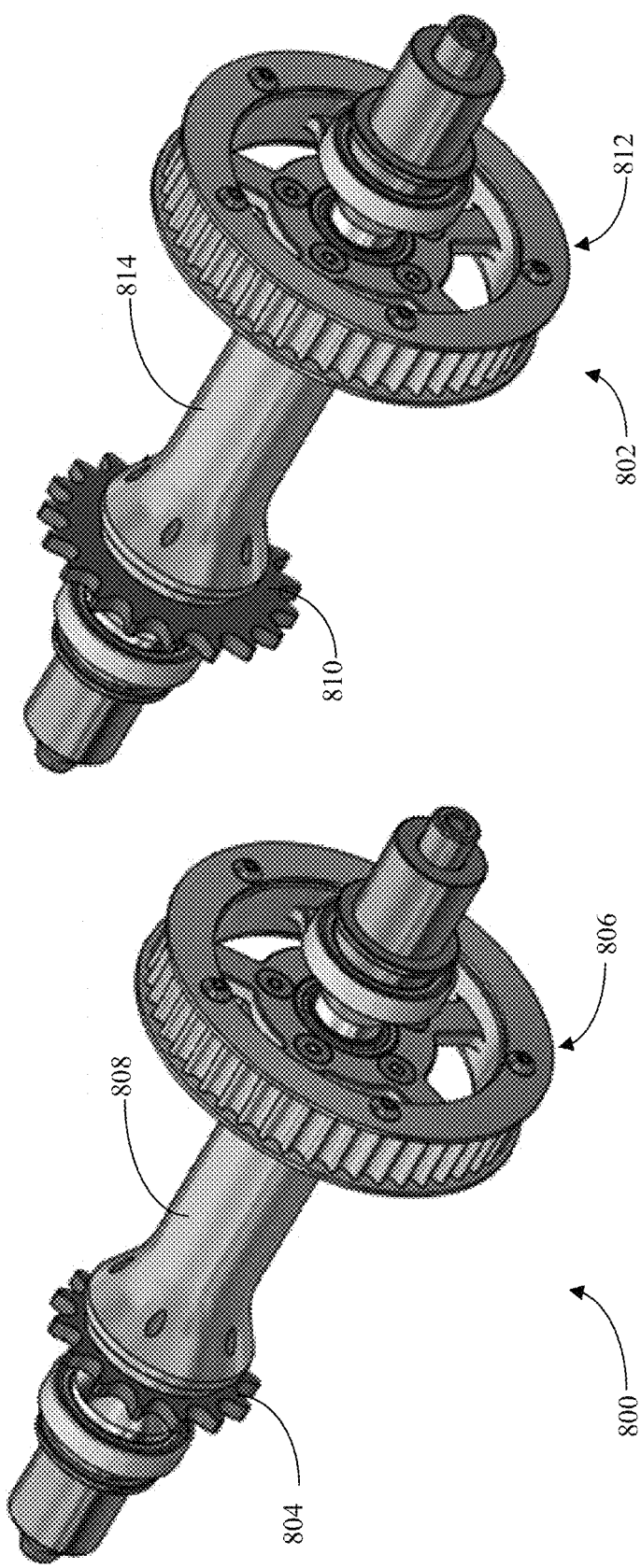
FIG. 8 illustrates different assembled gear cartridges in a swappable drive train assembly according to an embodiment of the disclosure.

Different assembled gear cartridges can have different components, such as more, fewer, and/or different components than the illustrated assembled gear cartridge 104 in FIG. 1. Illustrated in FIG. 8 is two different assembled gear cartridges 800 and 802. The first assembled gear cartridge 800 includes a first sprocket 804, a first pulley 806, and a first jackshaft 808 therebetween. The second assembled gear 802 similarly includes a second sprocket 810, a second pulley 812, and a second jackshaft 814 therebetween. In the illustrated embodiment, the first pulley 806 and the second pulley 812 and the first jackshaft 808 and the second jackshaft 814 are similar, while the first sprocket 804 and the second sprocket 810 are different. More particularly, the first sprocket 804 is a 15 tooth sprocket while the second sprocket 810 is a 19 tooth sprocket. By switching from the first assembled gear cartridge 800 to the second assembled gear cartridge 802, the user can increase a drive ratio of the vehicle, and vice-versa.

The components described herein can be made of any suitable material and different components may be made of different material. For instance, the sprocket 108 can be made of a first material while the pulley 106 is made of a different second material.

Figure 9:
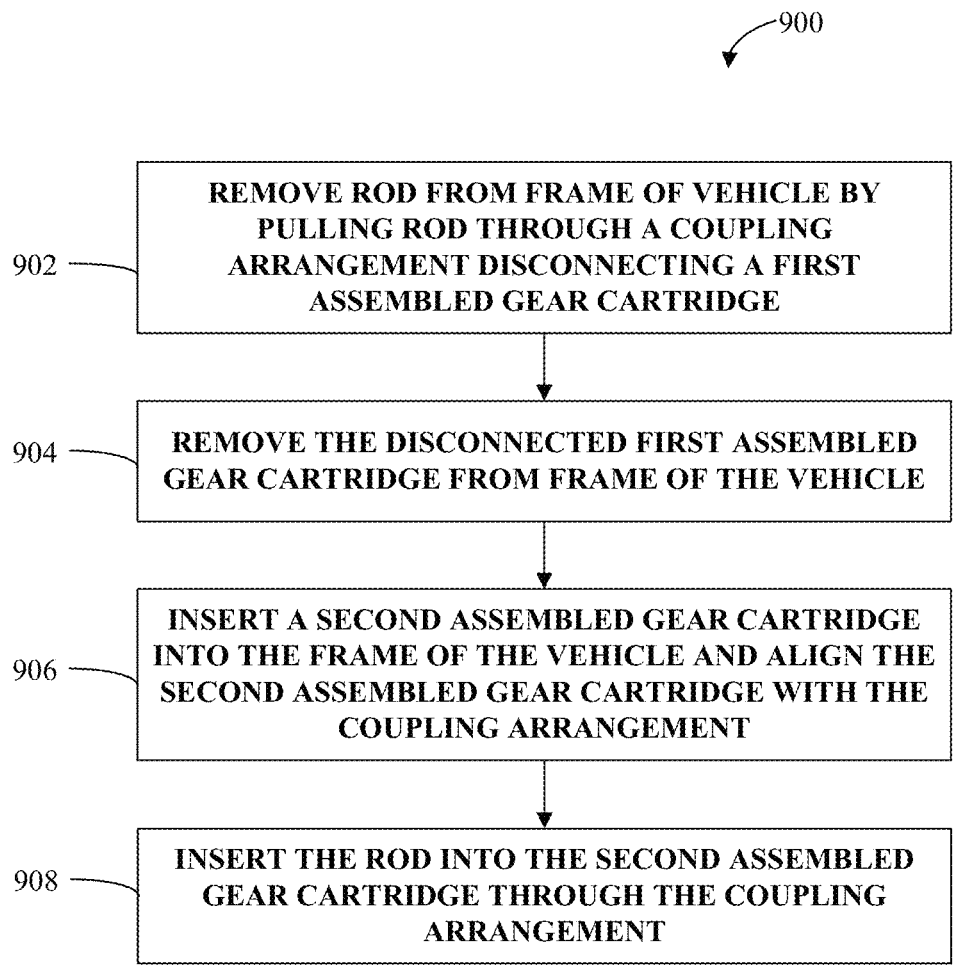
FIG. 9 is a high-level flow chart of a method according to an embodiment of the disclosure.

FIG. 9 shows a high-level flow chart of a method 900 of swapping assembled gear cartridges. In step 902, a rod 102 (FIG. 1) is disconnected and removed from a frame of a vehicle by pulling the rod 102 through a coupling arrangement, which also disconnects a first assembled gear cartridge from the frame of the vehicle. In step 904, the disconnected first assembled gear cartridge is removed from the frame of the vehicle, while the frame of the vehicle remains intact. In step 906, a second assembled gear cartridge is inserted into the frame of the vehicle and aligned with the coupling arrangement. In step 908, the rod 102 is then inserted into the second assembled gear cartridge by inserting the rod 102 through the coupling arrangement.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A swappable drive train assembly for a vehicle comprising:
    a rod removably attachable to a coupling arrangement of the vehicle, wherein the rod is detached from the coupling arrangement by passing the rod through a first aperture formed by the coupling arrangement, wherein the coupling arrangement connects a first vehicle frame component and a second vehicle frame component;
    an assembled gear cartridge attachable to the vehicle by the rod, wherein the rod extends through a second aperture defined by the assembled gear cartridge, wherein the assembled gear cartridge is configured to rotate about the rod with respect to the coupling arrangement, and
    a pivot sleeve arranged on the rod with a first portion that extends outside the coupling arrangement and a second portion that extends into the coupling arrangement between the rod and an interior of the coupling arrangement;
    wherein the assembled gear cartridge is attachable to the vehicle by extending the rod through the first aperture and the second aperture which maintains the connection between the first vehicle frame component and the second vehicle frame component while attaching and detaching the assembled gear cartridge.

2. The swappable drive train assembly of claim 1, wherein the assembled gear cartridge includes a first rotation transmission structure at a first end, a second rotation transmission structure at a second end that is opposite the first end, and a jackshaft extending therebetween.

3. The swappable drive train assembly of claim 2, wherein the first rotation transmission structure comprises a pulley, wherein the second rotation transmission structure comprises a sprocket.

4. The swappable drive train assembly of claim 1, further comprising a jackshaft spacer arranged on the rod between the assembled gear cartridge and the coupling arrangement when the assembled gear cartridge is attached to the vehicle, wherein the jackshaft spacer is shaped to space the assembled gear cartridge from the coupling arrangement.

5. The swappable drive train assembly of claim 1, further comprising a swing arm attachment arranged on the rod between the assembled gear cartridge and the coupling arrangement when the assembled gear cartridge is attached to the vehicle, wherein the swing arm attachment is configured for attachment to a swing arm frame of the vehicle.

6. The swappable drive train assembly of claim 1, wherein the rod is further removably attachable to a second coupling arrangement of the vehicle, wherein second coupling arrangement additionally connects the first vehicle frame component and the second vehicle frame component, wherein the rod is configured to extend between the coupling arrangement and the second coupling arrangement.

7. The swappable drive train of claim 6, wherein the assembled gear cartridge is shaped to extend along the rod between a first pivot clamp arrangement and a second pivot clamp arrangement.

8. The swappable drive train assembly of claim 1, further comprising:

a trim ring arranged on a first side of the coupling arrangement, wherein the assembled gear arrangement is arranged on a second side of the coupling arrangement opposite the first side; and a connector configured to connect the trim ring and the rod to prevent lateral movement of the assembled gear arrangement relative to the coupling arrangement.

9. The swappable drive train assembly of claim 1, further comprising a second assembled gear cartridge attachable to the vehicle by the rod, wherein the second assembled gear cartridge is configured to rotate about the rod with respect to the coupling arrangement, wherein the assembled gear cartridge includes a first sprocket, wherein the second gear cartridge includes a second sprocket that is different from the first sprocket.

10. A vehicle comprising:
a first vehicle frame component;
a second vehicle frame component;
a coupling arrangement configured to couple the first vehicle frame component and the second vehicle frame component; and
a swappable drive train assembly removably attachable to the coupling arrangement, wherein the swappable drive train assembly is further configured for attachment to and detachment from the coupling arrangement without requiring disconnection of the first vehicle frame component and the second vehicle frame component, wherein the swappable drive train assembly includes:
a rod removably attachable to the coupling arrangement; and
an assembled gear cartridge rotatably attached to the rod, wherein the assembled gear cartridge is configured to rotate about the rod with respect to the coupling arrangement; and
wherein an interior surface of the coupling arrangement is shaped to receive a pivot sleeve arranged between the rod and the interior surface of the coupling arrangement.

11. The vehicle of claim 10, wherein the coupling arrangement includes:
a first pivot clamp;
a second pivot clamp; and
a connector configured to connect the first pivot clamp and the second pivot clamp.

12. The vehicle of claim 10, further comprising a swing arm frame, wherein the swappable drive train assembly further includes a swing arm attachment arranged on the rod between the assembled gear cartridge and the coupling arrangement when the assembled gear cartridge is attached to the vehicle, wherein the swing arm attachment is configured for attachment to the swing arm frame.

13. The vehicle of claim 10, further comprising a peg assembly configured for attachment to the vehicle, wherein the coupling arrangement is shaped for attachment of the peg assembly on a first side of the coupling arrangement and extension of the rod from a second side of the coupling arrangement opposite the first side, wherein the peg assembly includes a protrusion for attaching a pedal to the peg assembly.

14. The vehicle of claim 13, wherein the peg assembly includes a second protrusion for attaching a kickstand to the peg assembly.

15. The vehicle of claim 10, further comprising a second coupling arrangement configured to couple the first vehicle frame component and the second vehicle frame component, wherein the swappable drive train assembly is further removably attachable to the second coupling arrangement, wherein the rod extends between the coupling arrangement and the second coupling arrangement when the swappable drive train assembly is attached to the vehicle.

16. The vehicle of claim 10, wherein the swappable drive train assembly further includes a second assembled gear cartridge attachable to the vehicle by the rod, wherein the second assembled gear cartridge is configured to rotate about the rod with respect to the coupling arrangement, wherein the assembled gear cartridge includes a first sprocket, wherein the second gear cartridge includes a second sprocket that is different from the first sprocket.

17. A swappable drive train assembly for a vehicle comprising:
a rod removably attachable to a coupling arrangement of the vehicle that connects a first vehicle frame component and a second vehicle frame component;
a first assembled gear cartridge attachable to the vehicle by the rod, wherein the first assembled gear cartridge includes a first sprocket; and
a second assembled gear cartridge attachable to the vehicle by the rod, wherein the second assembled gear cartridge includes a second sprocket, wherein the first sprocket and the second sprocket are different,
wherein at least one of the first assembled gear cartridge or the second gear cartridge is attachable to the vehicle by extending the rod through an aperture defined by the coupling arrangement while maintaining the connection between the first vehicle frame component and the second vehicle frame component,
wherein an interior surface of the coupling arrangement is shaped to receive a pivot sleeve arranged between the rod and the interior surface of the coupling arrangement.

18. The swappable drive train assembly of claim 16, wherein the rod is further removably attachable to a second coupling arrangement of the vehicle that additionally connects the first vehicle frame component and the second vehicle frame component, wherein the rod is configured to extend between the coupling arrangement and the second coupling arrangement,
wherein at least one of the first assembled gear cartridge or the second assembled gear cartridge is configured to extend along the rod between the coupling arrangement and the second coupling arrangement.

* * * * *